United States Patent [19]

Chivari

[11] 4,040,270
[45] Aug. 9, 1977

[54] COUPLING ADAPTED TO CONNECT RADIALLY OFFSET SHAFTS

[76] Inventor: Ilie Chivari, Berliner Strasse 1, 4680 Wanne-Eickel, Germany

[21] Appl. No.: 575,815

[22] Filed: May 8, 1975

[30] Foreign Application Priority Data

June 29, 1974 Germany ............................... 2431383
Mar. 22, 1975 Germany ............................... 2512829

[51] Int. Cl.² .............................................. F16D 3/54
[52] U.S. Cl. ........................................... 64/19; 64/12; 64/31
[58] Field of Search ........................... 64/19, 12, 20, 31

[56] References Cited

U.S. PATENT DOCUMENTS

| | | | |
|---|---|---|---|
| 1,898,806 | 2/1933 | Baker | 64/19 |
| 2,592,796 | 4/1952 | Doussain | 64/19 |
| 3,242,694 | 3/1966 | Schmidt | 64/31 |

FOREIGN PATENT DOCUMENTS

| | | | |
|---|---|---|---|
| 137,079 | 3/1930 | Switzerland | 64/19 |
| 581,854 | 10/1946 | United Kingdom | 64/19 |

*Primary Examiner*—Samuel Scott
*Assistant Examiner*—Randall Heald
*Attorney, Agent, or Firm*—Darbo, Robertson & Vandenburgh

[57] ABSTRACT

Various embodiments of couplings are described which comprise two main coupling members and two intermediate coupling members. The main coupling members are adapted to be mounted on shafts which are not necessarily in alignment. The intermediate coupling members are rotatable with respect to each other and each is connected by links to each of the main coupling members.

38 Claims, 25 Drawing Figures

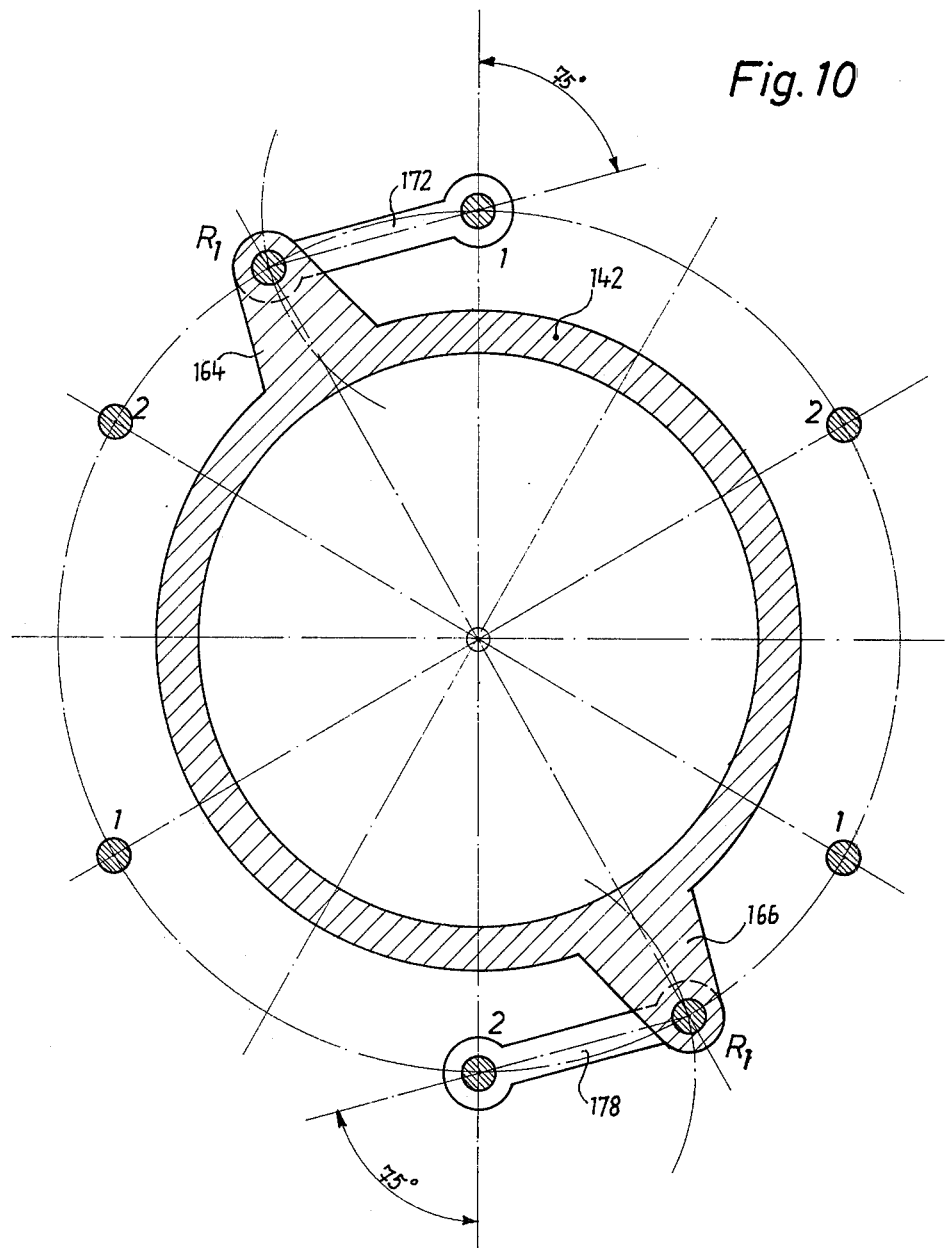

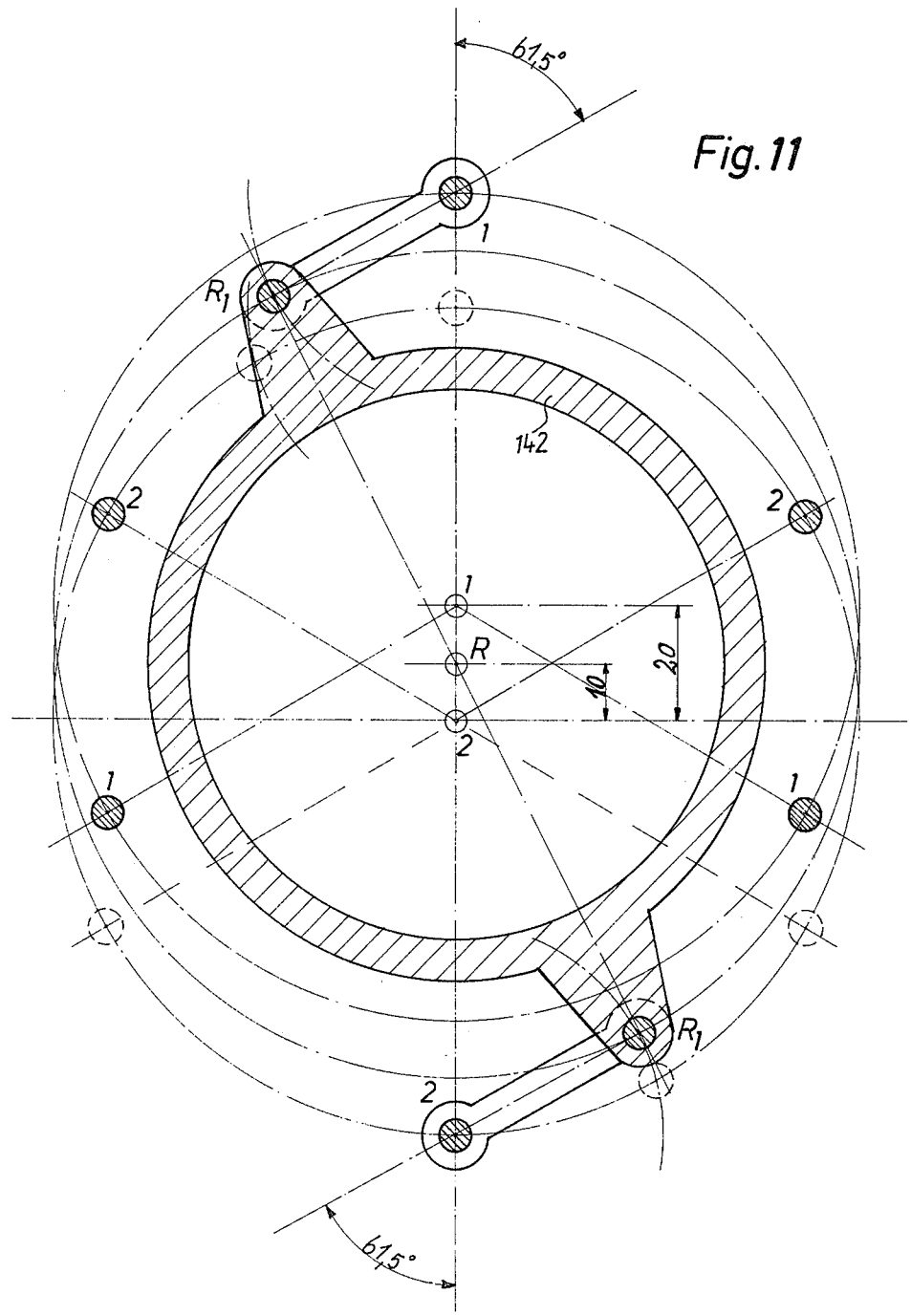

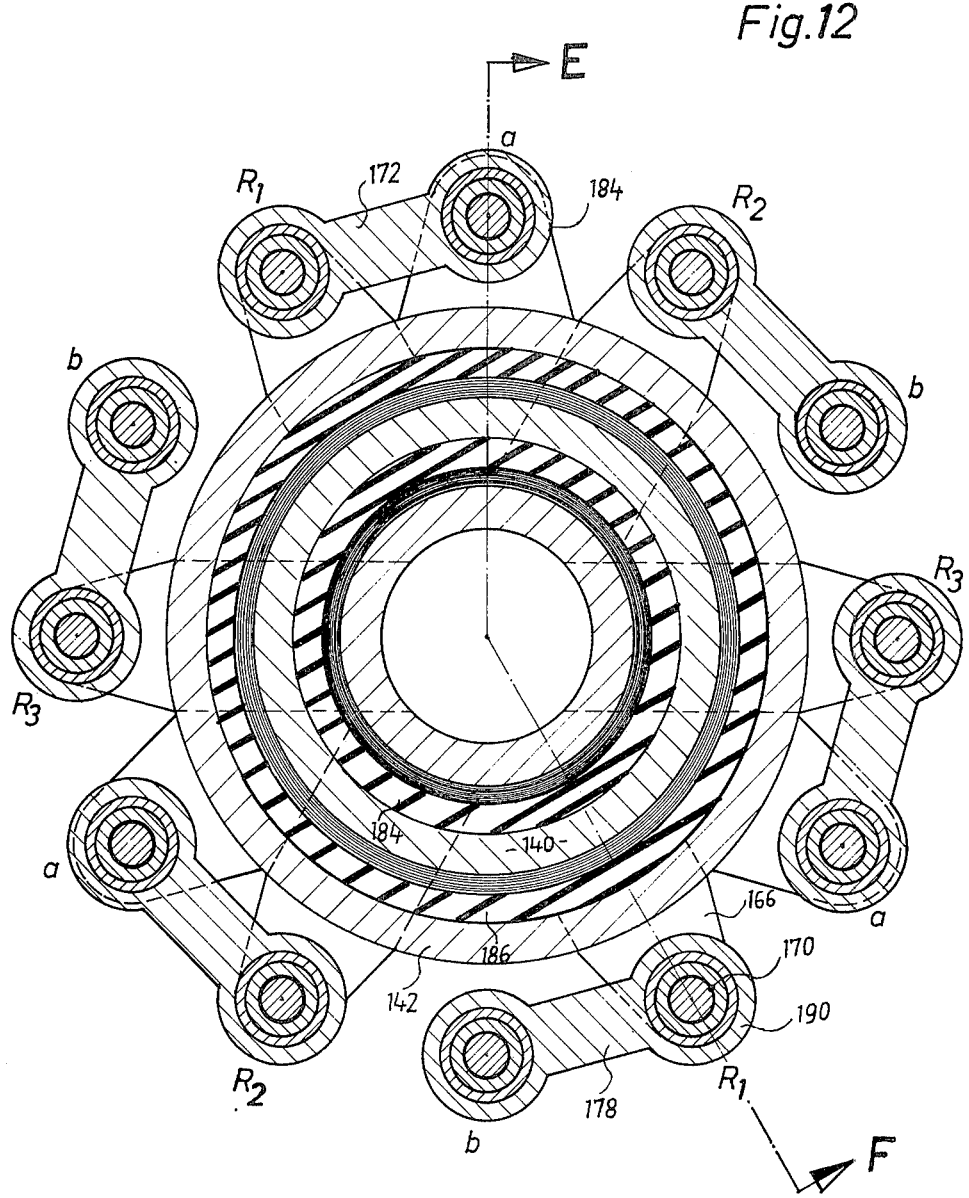

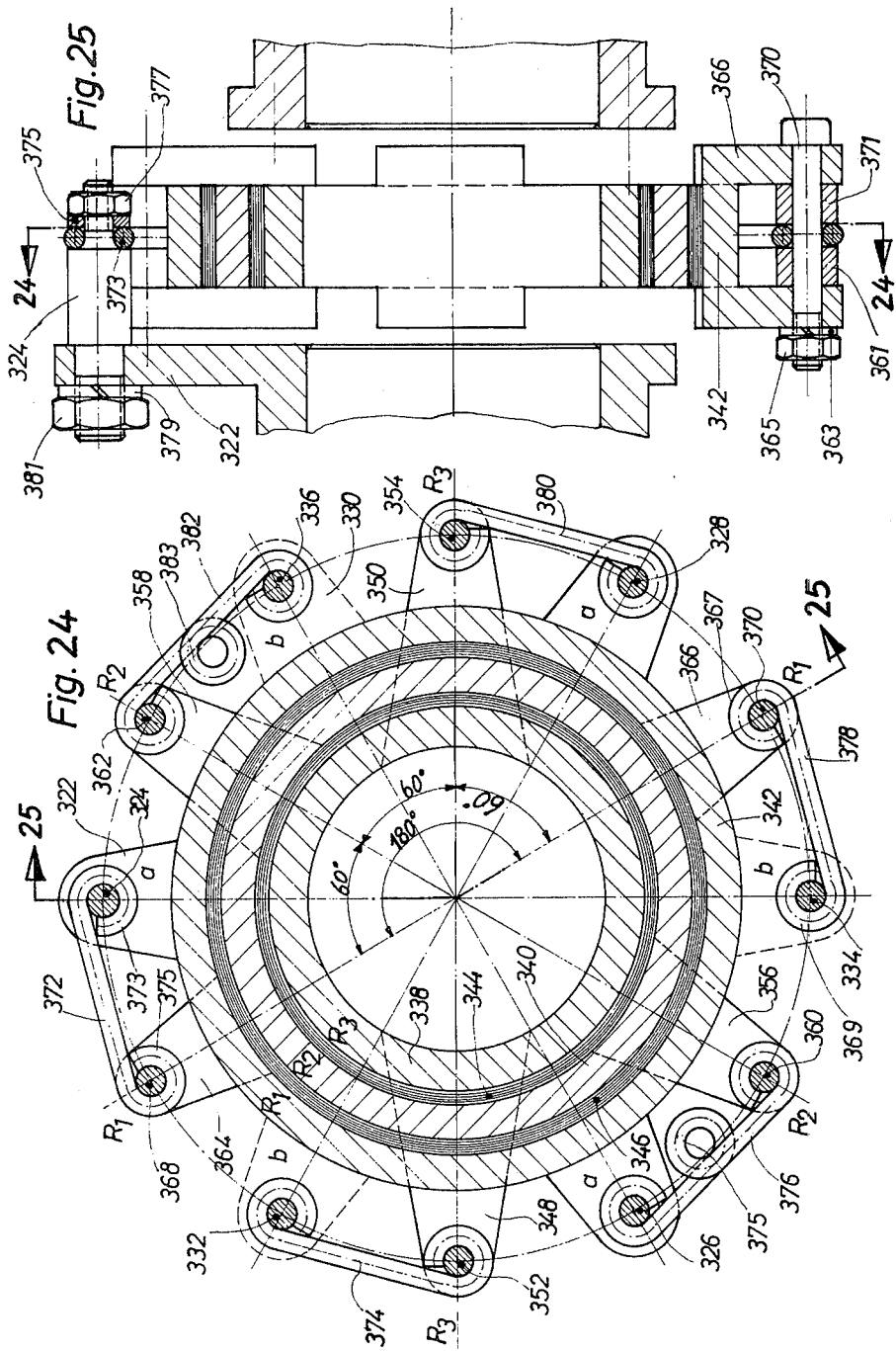

COUPLING ADAPTED TO CONNECT RADIALLY OFFSET SHAFTS

BACKGROUND AND SUMMARY OF THE INVENTION

The invention relates to a coupling adapted to connect radially rotating shafts comprising: a first main coupling member for connection to a first shaft, a second main coupling member for connection to a second shaft, and floating intermediate member means, the latter being connected to said first and second main coupling members by link members.

Prior art couplings for angle-true transmission of rotary movements between parallel shafts having variable radial offset of the shafts comprise an intermediate member which is connected to each of the two coupling members by linkages of at least three mutually parallel link members. (See Kurt Rauh "Praktische Getriebelehre", 53 and 54, Springer-Verlag, Berlin, 2d edition, volume 1, page 31). The intermediate member is always kept parallel to the first (driving) coupling member by the link members, so that it rotates angle-true with this first coupling member. In the same way, the intermediate member is in driving connection with the second (driven) coupling member through parallel link members, so that the second coupling member, in turn, follows the intermediate member and thus the first coupling member in angle-true manner. The length of the link members is smaller than the spacing of the pivot points on the coupling members and the intermediate member, respectively, so that the link members may rotate past each other with continuous rotary movement. In a prior art embodiment of such a coupling (German Pat. No. 1,233,667) the intermediate member comprises a floating disc-shaped body.

This prior art coupling is based on the characteristic of a parallel link member linkage to guide one part parallel with respect to another one. By using two such parallel link member linkages in series, the linkages being arranged to be movable relative to each other in scissor-like manner, two shafts can be coupled with each other, with the shafts being radially offset or also movable relative to each other within an area determined by the length of the link members. In a coupling operating in accordance with this principle each of the link members is, during each revolution, subjected once to compression and once to tension while rotating through 360° relative to the intermediate member. Therefore the pivot pin moves back and forth in its pivot bore due to the inevitable clearance. This results in vibrations, noise and increased wear, particularly when large torques are transmitted. In addition, in the prior art coupling each link member is engaged in the torque transmission in accordance with a sine function of the angle of rotation, thus only to a small proportion in certain ranges of angle. On the other hand the number of the link members that can be used to transmit the torque is limited to three for geometrical reasons. This also causes problems with regard to the transmission of torques.

It is an object of the invention to provide a coupling of the type initially defined herein which is adapted to transmit high torques.

A more specific object of the invention is to provide such a coupling in which during rotation of the shaft in a particular direction each one of the link members is loaded in one direction only, thus either by tensile load or by compression load; in which more than three link members may be provided if required; in which each one of the link members is used substantially completely to transmit torque during each phase of the revolution; and in which during each revolution each one of the link members carries out only a limited rocking movement if the axes are radially offset.

According to the invention, these objects are achieved in that the intermediate member means comprise at least two intermediate coupling members rotatable with respect to each other about an axis, each one of the intermediate coupling members being connected to the first (e.g. input) of the main coupling members through one link member and to the second (e.g. output) of the main coupling members through another link member. In a coupling of the invention the first, for example driving, main coupling member is connected with the second main coupling member through a link member, an intermediate coupling member and a further link member. Another drive connection is established from the first main coupling member, another link member, a second intermediate coupling member and still another link member again to the second main coupling member. The intermediate coupling members are rotatable relative to each other and floating. If the axes of the first and second shafts are in alignment, the whole assembly operates like a rigid connection between the shafts and rotates about the common shaft axis. In this case the link members do not move relative to the main coupling members and intermediate coupling members and, in each phase of the revolution take part equally in the torque transmission. If the axes of the shafts are parallel but slightly offset, this offset of the axes will be compensated for by relative rotation of the intermediate coupling members, providing the required additional degree of freedom. Also in this case the driver main coupling member is moved along by the driving one through the link members and the intermediate coupling members, only the link members making a rocking compensating movement.

DESCRIPTION OF THE DRAWINGS

FIG. 10 shows a single intermediate coupling member and the associated pair of link members of the embodiment of FIG. 8;

FIG. 11 shows the intermediate coupling member and pair of link members of FIG. 10 with the axes radially offset;

FIG. 12 shows a modification of the embodiment of FIG. 8 which, on the one hand, exhibits resiliency in peripheral direction and, on the other hand, permits compensation for angular offset of the shafts;

FIG. 24 is a sectional view of further embodiment similar to that of FIG. 8 and permitting angular offset of the shaft axes, the section being that as seen along line 24—24 of FIG. 25; and FIG. 25 is a sectional view along line 25—25 of FIG. 24.

DESCRIPTION OF SPECIFIC EMBODIMENTS

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

Figure 1:
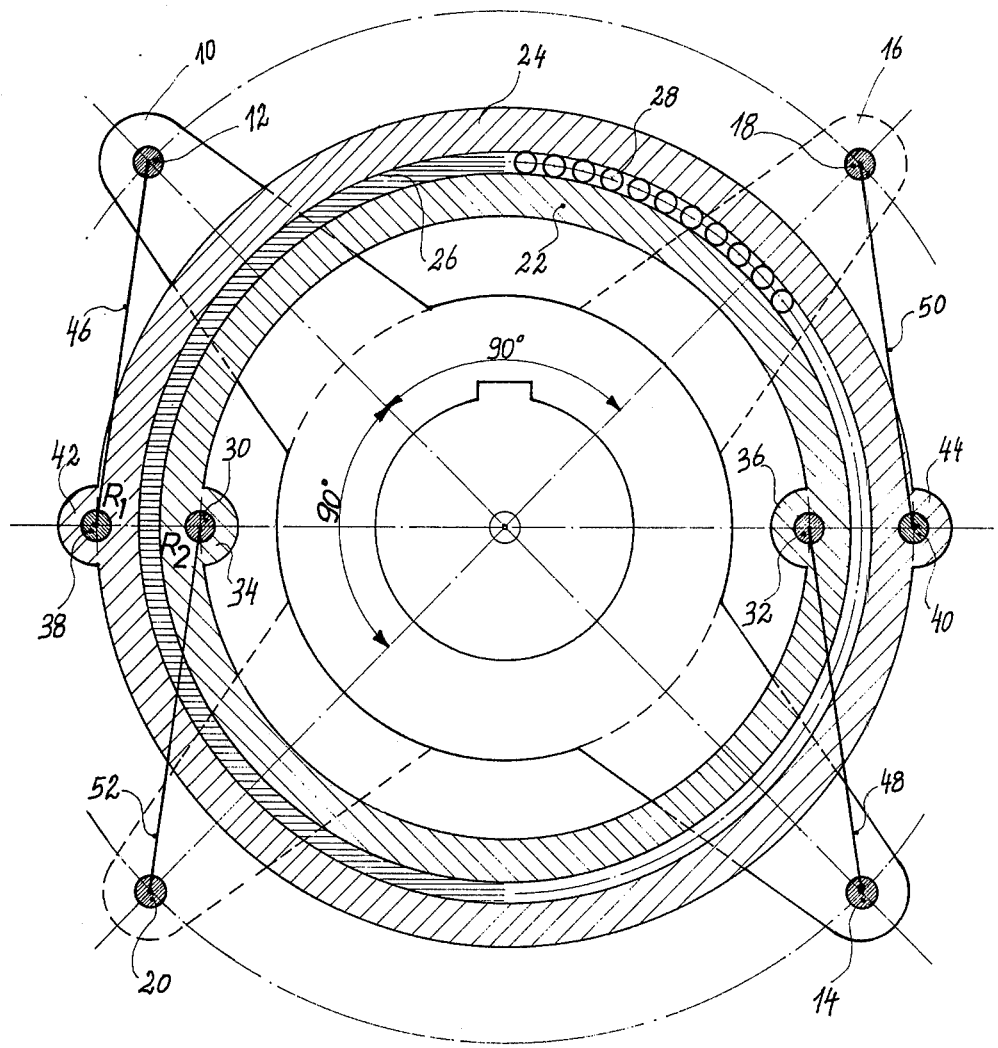
FIG. 1 is a schematic illustration of a first embodiment of the invention with the shaft axes in alignment.
Figure 2:
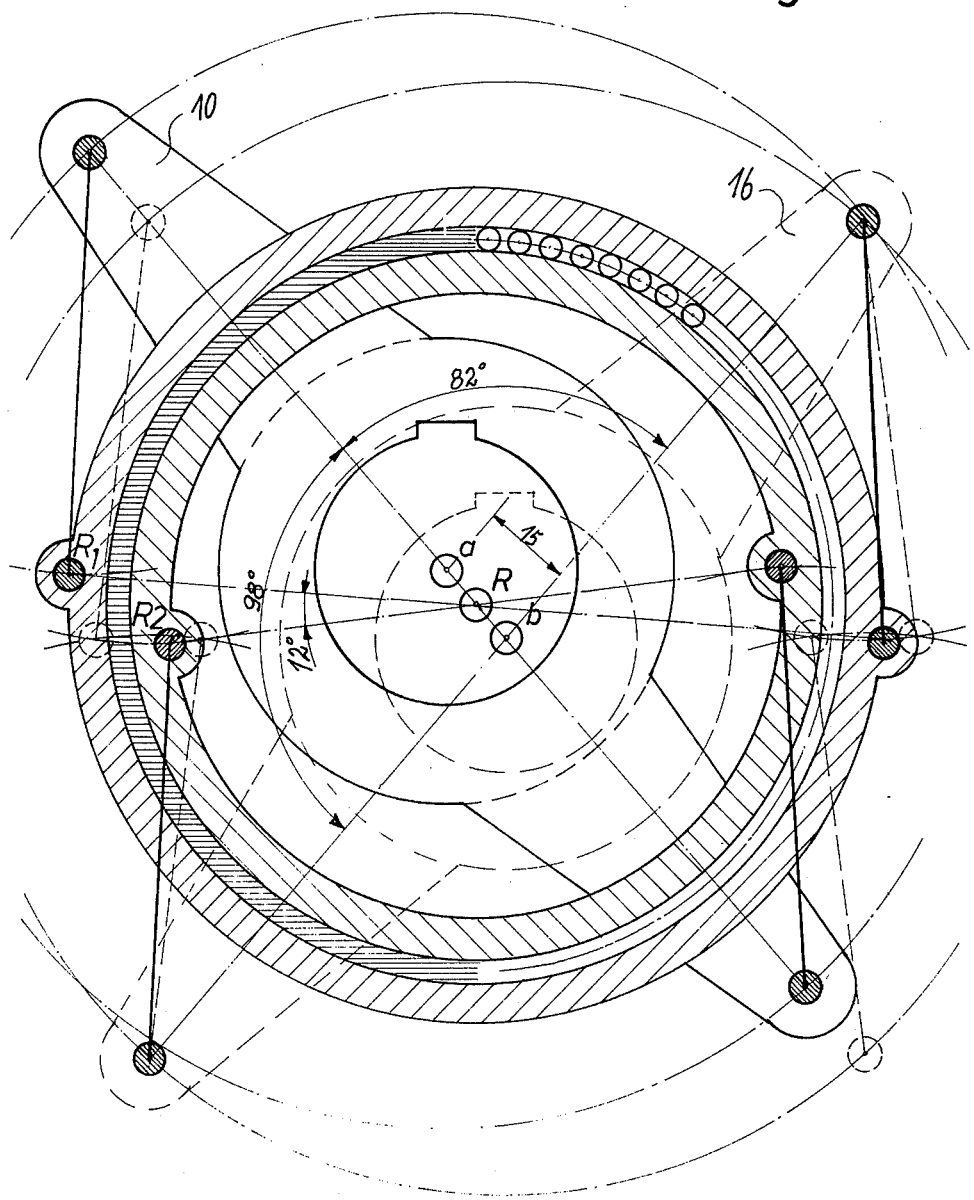
FIG. 2 is an illustration of the embodiment of FIG. 1 with the axes radially offset.

In the embodiment of FIGS. 1 and 2 two pivot pins 12 and 14 are provided on a first main coupling member 10. Main coupling member 10 is secured to a first shaft, e.g., the input or driving shaft. The pivot pins 12, 14 are located centrosymmetrical with respect to the axis $a$ of that shaft. A second coupling member 16 is connected to the second main shaft, e.g., the output or driven shaft. Two pivot pins 18, 20 are provided on coupling member 16. These pins are centrosymmetrical with respect to the axis $b$ of the second shaft and at the same distance from this axis $b$ as the distance of pivot pins 12, 14 from axis $a$. The intermediate coupling members comprise an inner ring 22 and an outer ring 24. The outer ring is mounted for rotation on the inner ring 22 as by means of a layer 26 of oil-soaked brake liner material as shown in the left half of FIG. 1. Alternatively, the ring 24 may be mounted for rotation on ring 22 by means of a ball or roller bearing, as indicated in the right half of FIG. 1. Pivot pins for pivoting the links are provided on the rings 22 and 24. The pivot pins 30, 32 on the inner ring 22 are provided at diametrically opposite locations on bosses or extensions 34, 36 of ring 22, said bosses projecting radially inwards. The pivot pins or lugs 38, 40 on outer ring 24 are provided at diametrically opposite locations on bosses or extensions 42, 44 of ring 24, said bosses projecting radially outwards. The pivot pins 12 and 14 of the first main coupling member 10 are connected to the pivot pins 38 and 32, respectively, through links 46 and 48, respectively. The pivot pins 18, 20 of the second main coupling member 16 are connected to the pivot pins 40 and 42, respectively, through links 50 and 52, respectively.

In the embodiment illustrated, the pairs of pivot pins 12, 14 and 18, 20 are angularly offset by 90° when the shaft axes are in alignment. With the axes of the shafts in alignment, the pivot pins 38, 30 and 32, 40 on the rings 22 and 24 are located on a straight line to which the pivot pins 12 and 20, and 18 and 14, respectively, are symmetric. Consequently, the links 46 and 48 extend substantially tangential and counterclockwise from the pins 12 and 14, and the links 50 and 52 extend clockwise from the pins 18 and 20 and substantially tangential.

FIG. 2 shows the coupling with a radial offset of the shaft axes $a$ and $b$ relative to each other. This offset of the shaft axes by, in the example shown, 15 millimeters is compensated for by displacement of the center R of the rings 22 and 24 by 7.5 millimeters in the middle between the two shaft axes, and in addition—in the example shown—by relative rotation of the two shafts 22 and 24 through 12°.

Figure 3:
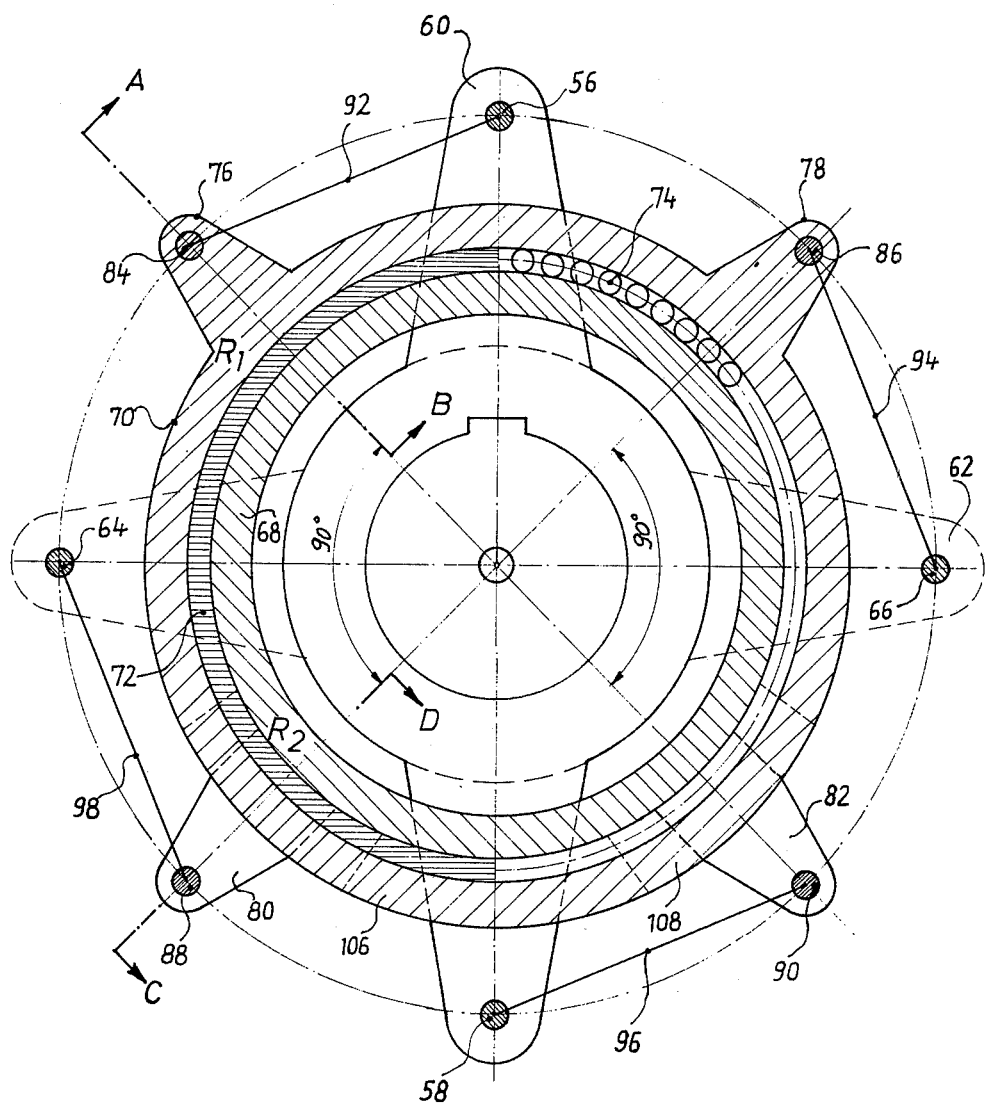
FIG. 3 is a schematic illustration of a second embodiment of the invention with the shaft axes in alignment.
Figure 4:
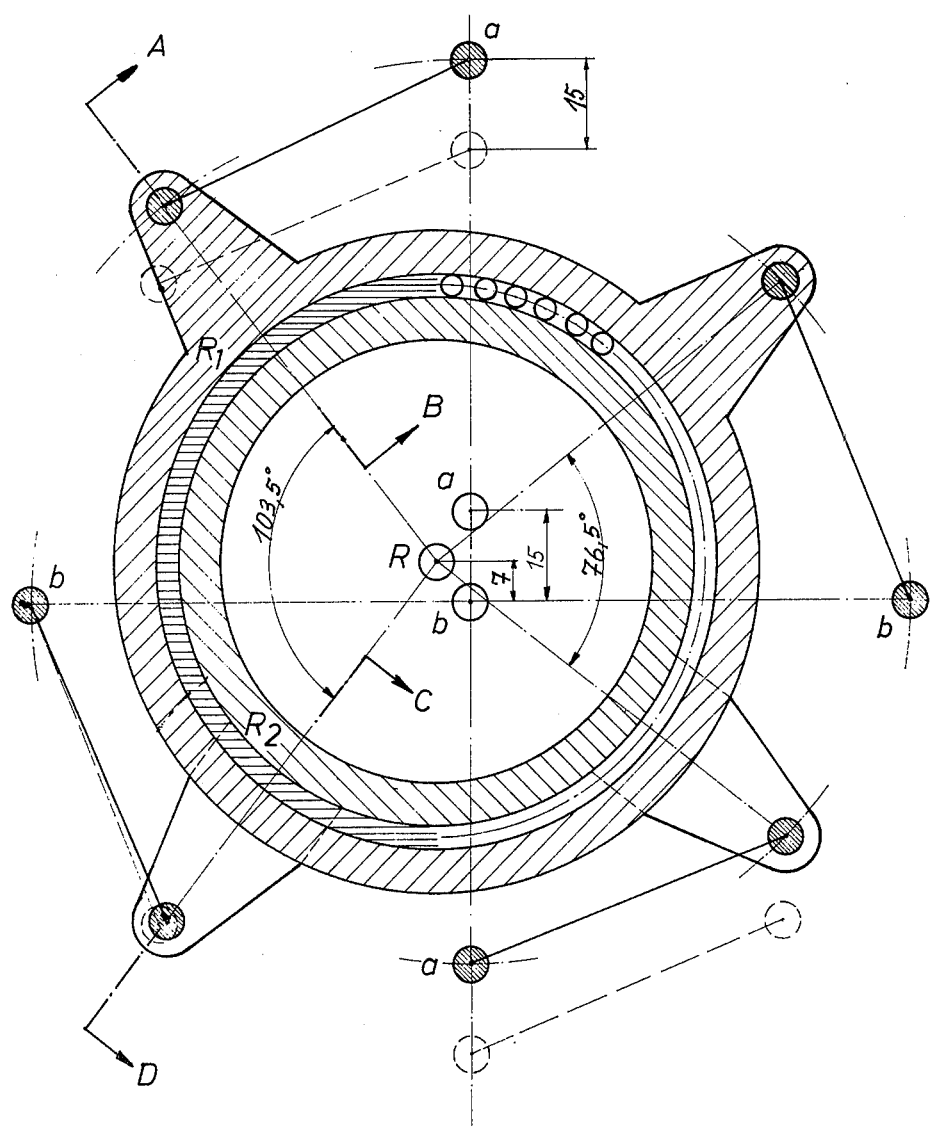
FIG. 4 illustrates the embodiment of FIG. 3 with the axes radially offset.

In the embodiment of FIGS. 3 and 4 two pivot pins 56, 58 are affixed to the first main coupling member 60 centrosymmetrical to the axis $a$ of the driving shaft. A pair of pivot pins 64, 66 (or other pivoting means) is affixed to the second main coupling member 62, which is connected to the driven shaft. The pivot pins 56, 58 are centrosymmetrical to the axis $b$ of the driven shaft. The intermediate coupling members comprise an inner ring 68 and an outer ring 70 journaled thereon. The journaling of the outer ring 70 on the inner one can be either through a layer 72 of oil-soaked brake liner material or through a ball or roller bearing 74 similar to the embodiment of FIGS. 1 and 2. Rings 70 and 68 have outwardly projecting radial extensions 76, 78 and 80, 82, respectively. Extensions 76 and 78 on the outer ring 70 are angularly offset by 90°. Also, the extensions 80 and 82 on the inner ring 68 are angularly offset by 90°. The extensions 76, 78 and 80, 82 hold pivot pins 84, 86 and 88, 90, respectively. A link 92 extends from the pivot pin 56 on the first main coupling member 60 to the pivot pin 84 on the extension 76 of the outer ring 70. A link 94 extends from the pivot pin 66 on the second main coupling member 62 to the pivot pin 86 on the extension 78 of the outer ring 70. A link 96 extends from the pivot pin 58 on the first main coupling member to the pivot pin 90 on the extension 82 of the inner ring 68. A link 98 extends from the pivot pin 64 on the second main coupling member 62 to the pivot pin 88 on the extension 80 of the inner ring 68.

The distance of the pivot pins 56 and 58 from the axis $a$ of the first shaft is equal to the distance of the pivot pins 64 and 66 from the axis $b$ of the second shaft. This same distance is used to locate the pivot pins 76, 78, 88 and 90 from the center R of the rings 68 and 70. With the axes $a$ and $b$ of the shafts in alignment, as shown in FIG. 3, the pivot pins 64 and 66 are angularly offset by 90° with respect to the pivot pins 56 and 58. The pivot pins 84, 88, 90 and 86 are angularly offset by 90° relative to each other and by 45° relative to the respective pivot pins 56, 64, 58 and 66. All pivot pins 56, 76, 64, 88, 58, 90, 66 and 86 are located on a circle about the coincident axes $a$, $b$ and R of the main coupling members and the intermediate coupling members. The links 92, 94, 96 and 98 are of equal lengths and extend in the same direction (counterclockwise) from the pivot pins 56, 64, 58 and 66 secantial with respect to said circle.

Figure 5:
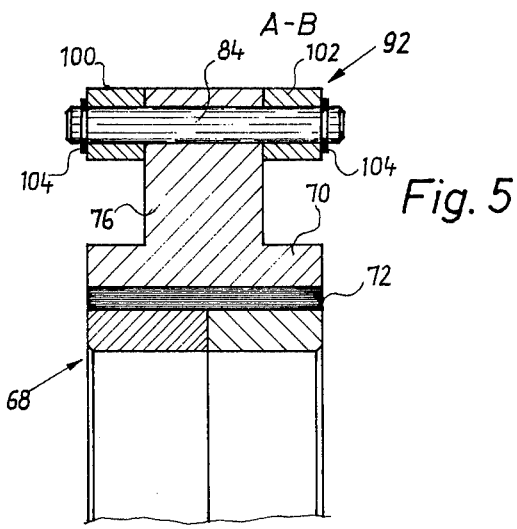
FIG. 5 is a sectional view along line A–B of FIG. 3.

FIG. 5 is a sectional view along line A-B of FIG. 3. It can be seen that the inner ring 68 is composed of two halves. The outer ring 70 journaled thereon has the radial extension 76 which is symmetric to the center plane of ring 70 but is narrower than the ring. The pivot pin 84 is mounted in the extension 76 and projects axially from the extension 76 on both sides. The end of link 92 forms a bifurcated pair of lugs or bosses 100, 102 positioned on opposite sides of the extension 76 and is pivoted on the projecting ends of the pivot pin 84. The pivot pin 84 is secured axially by snap rings 104.

Figure 6:
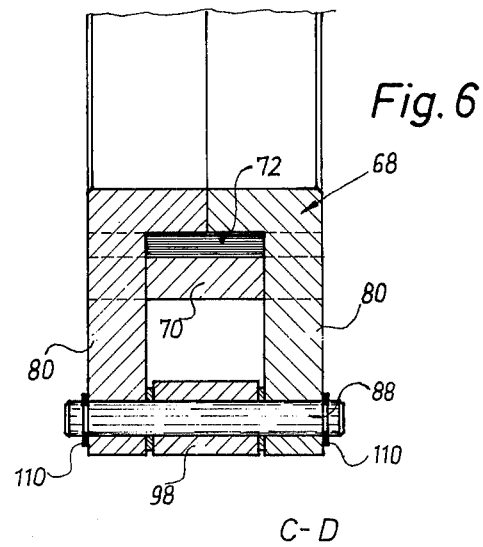
FIG. 6 is a sectional view along line C–D of FIG. 3.

FIG. 6 is a sectional view along line C-D of FIG. 3. The two-part inner ring 68 has a pair of lateral radial extensions 80, which extend on both sides of the outer ring 70. To this end ring 70 is narrower in angular ranges 106, 108 around these extensions 80 and 82, respectively. The link 98 is positioned between the extensions. The pivot pin 88 extends between the pair of extensions 80 and through the link 98. The pivot pin 88 is again secured axially by snap rings 110.

FIG. 4 shows the coupling of FIG. 3 with the shaft axes $a$ and $b$ radially offset. It can also be seen here that the coupling compensates for this offset by a displacement of the center R of the two rings 68, 70 and by relative rotation of the two rings 68, 70.

Figure 7:
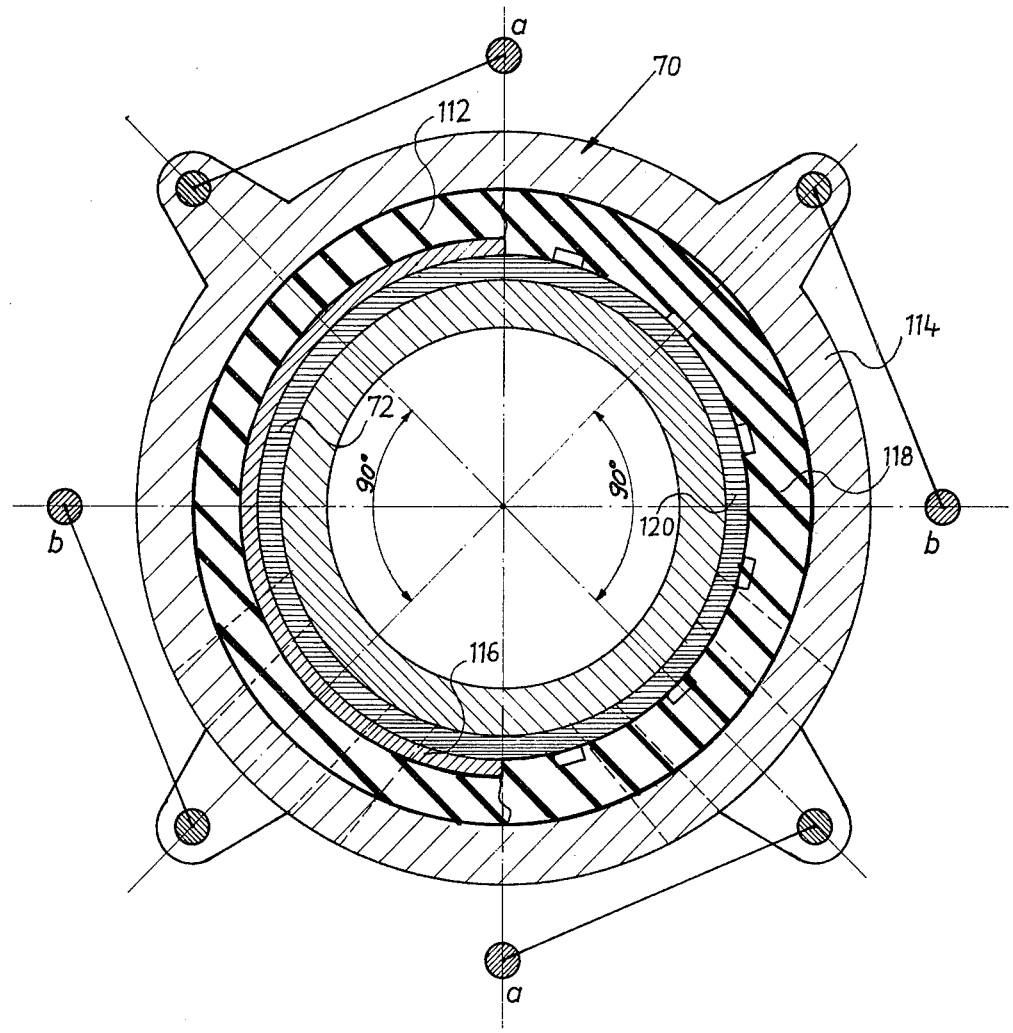
FIG. 7 shows a modification of the embodiment of FIG. 3 exhibiting resiliency in peripheral direction.

FIG. 7 shows a modification of the coupling of FIGS. 3 and 4. Corresponding elements bear the same reference numerals in FIG. 7 as in FIGS. 3 and 4. In this embodiment the outer ring 70 has a layer of elastomeric material, such as rubber. In the left half of FIG. 7 the elastomeric layer 112 is placed between an outer and inner steel ring parts 114 and 116 of ring 70 and is connected to these parts, for example, by vulcanization. The anti-friction layer 72 is glued to the inner surface of the inner steel ring part 116. In the right half of FIG. 7, the inner steel ring part 116 has been omitted and the anti-friction layer is backed directly by the elastomeric layer 118. In addition to friction slippage between these two layers is prevented by teeth or projections 120 on one layer, which extend into corresponding recesses of the other layer.

Though the coupling of FIGS. 3 and 4 permits radial offset of the shaft axes and does not resist radial vibrations of the shafts relative to each other, it is unyielding in the peripheral direction and thus is unable to take up impacts or to damp rotary vibrations. With a coupling of the invention such impacts or rotary vibrations become effective substantially as radial forces acting between the intermediate coupling members. By providing an elastomeric layer in the outer ring in the embodiment of FIG. 7, the bearing surface 72 may to a limited extent, yield resiliently to these radial forces. Thus the coupling will become "resilient" also in peripheral direction, i.e., to torques acting about the axes.

Another embodiment of the invention is shown in FIGS. 8 to 11. In this embodiment three pivot pins 124, 126 and 128 are arranged on the first main coupling member 122 at equal distances from the axis $a$ of the first shaft and angularly offset by 120° about this axis. Three pivot pins 132, 134 and 136 are affixed to the second main coupling member 130 at equal distances from the axis $b$ of the second shaft. There are three intermediate coupling members in the form of an inner ring 138, a median ring 140 and an outer ring 142. The median ring is journaled on the inner ring by means of an anti-friction layer 144. The outer ring 142 is journaled on the median ring 140 by means of an anti-friction layer 146.

The inner ring 138 has two diametrically opposite radial extensions 148, 150. A pivot pin 152 is mounted on extension 148. A pivot pin 154 is mounted on extension 150. Median ring 140 has two diametrically opposite radial extensions 156, 158. A pivot pin 160 is mounted on extension 156. A pivot pin 162 is mounted on extension 158. Two diametrically opposite radial extensions 164, 166 are provided on the outer ring 142. A pivot pin 168 is mounted on extension 164. A pivot pin 170 is mounted on extension 166. A link 172 connects the pivot pins 124 and 168. A link 174 connects the pivot pins 132 and 152. A link 176 connects the pivot pins 126 and 160. A link 178 connects the pivot pins 134 and 170. A link 180 connects the pivot pins 128 and 154. A link 182 connects the pivot pins 136 and 162.

The extensions 148, 150 and 156, 158 may be constructed similar to what is shown in FIG. 6. The extensions 164 and 166 may be of the type shown in FIG. 5.

Figure 8:
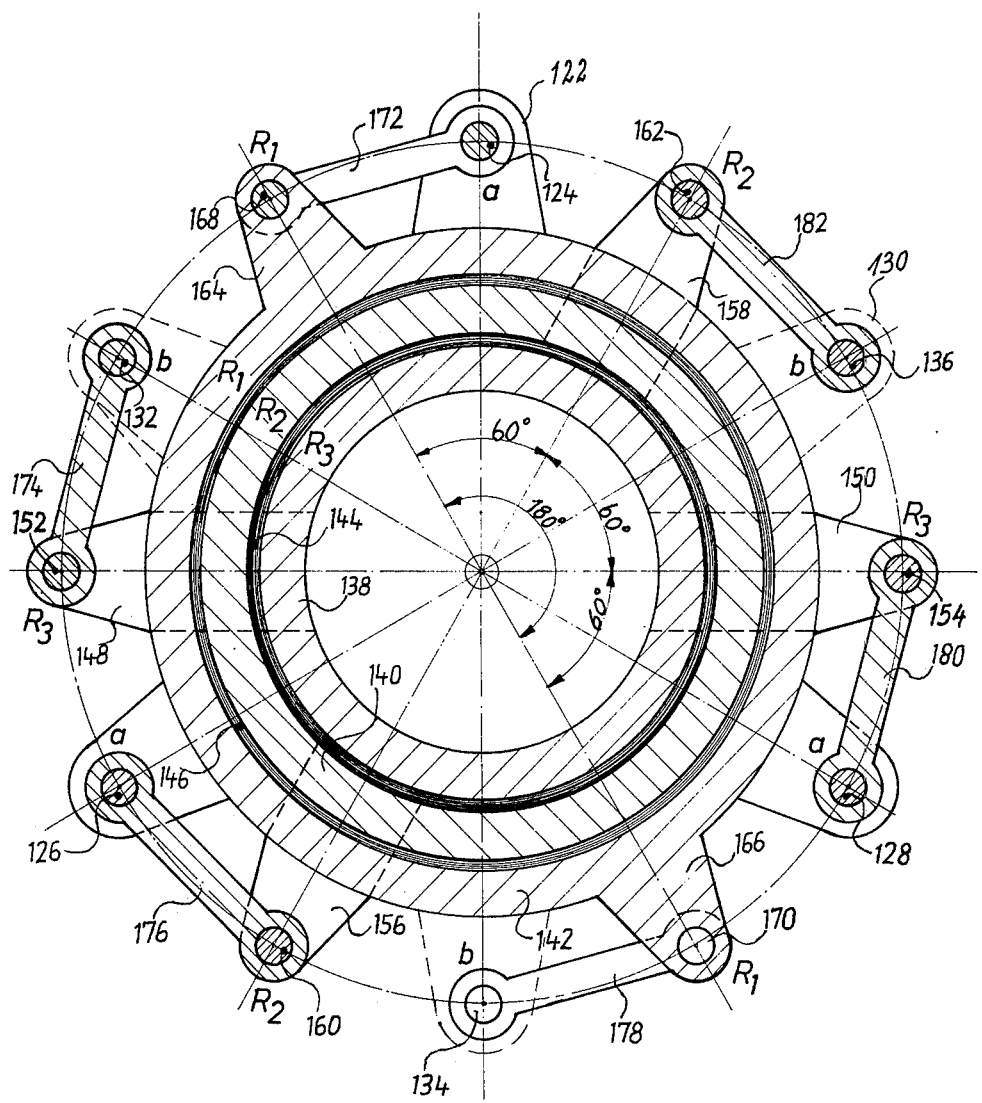
FIG. 8 illustrates a third embodiment of the invention having three intermediate coupling members rotatable relative to each other and an equal number of pairs of link members for the torque transmission with the axes of the shafts in alignment.

With the axes $a$ and $b$ of the first and second shafts, respectively, in alignment, then the rings 138, 140 and 142 (having a common center R) are concentric to these axes. The distances of the pivot pins 124, 126, 128 from the axis $a$ are equal to the distances of the pivot pins 132, 134, 136 from the axis $b$ and equal to the identical distances of the pivot pins 168, 152, 160, 170, 154 and 162 from the center R of the rings. In the position of FIG. 8, the pivot pins 132, 134, 136 on the second main coupling member 130 are angularly offset relative to the respective pivot pins 124, 126 and 128, respectively, on the first main coupling member 122. The pivot pins 168, 152, 160, 170, 154 and 162 on the extensions are also angularly offset by 60° relative to each other and are angularly offset by 30° relative to the intervening pivot pins 124, 132, 126, 134, 128, and 136 on the first and second main coupling members, respectively. Thus with the shaft axes in alignment all pivot pins are located on a circle in regular array, and the links extend secantially to this circle. They extend in the same direction, i.e., counterclockwise, from the pivot pins 124, 126, 128 and 132, 134, 136, respectively, carried by the coupling members.

Figure 9:
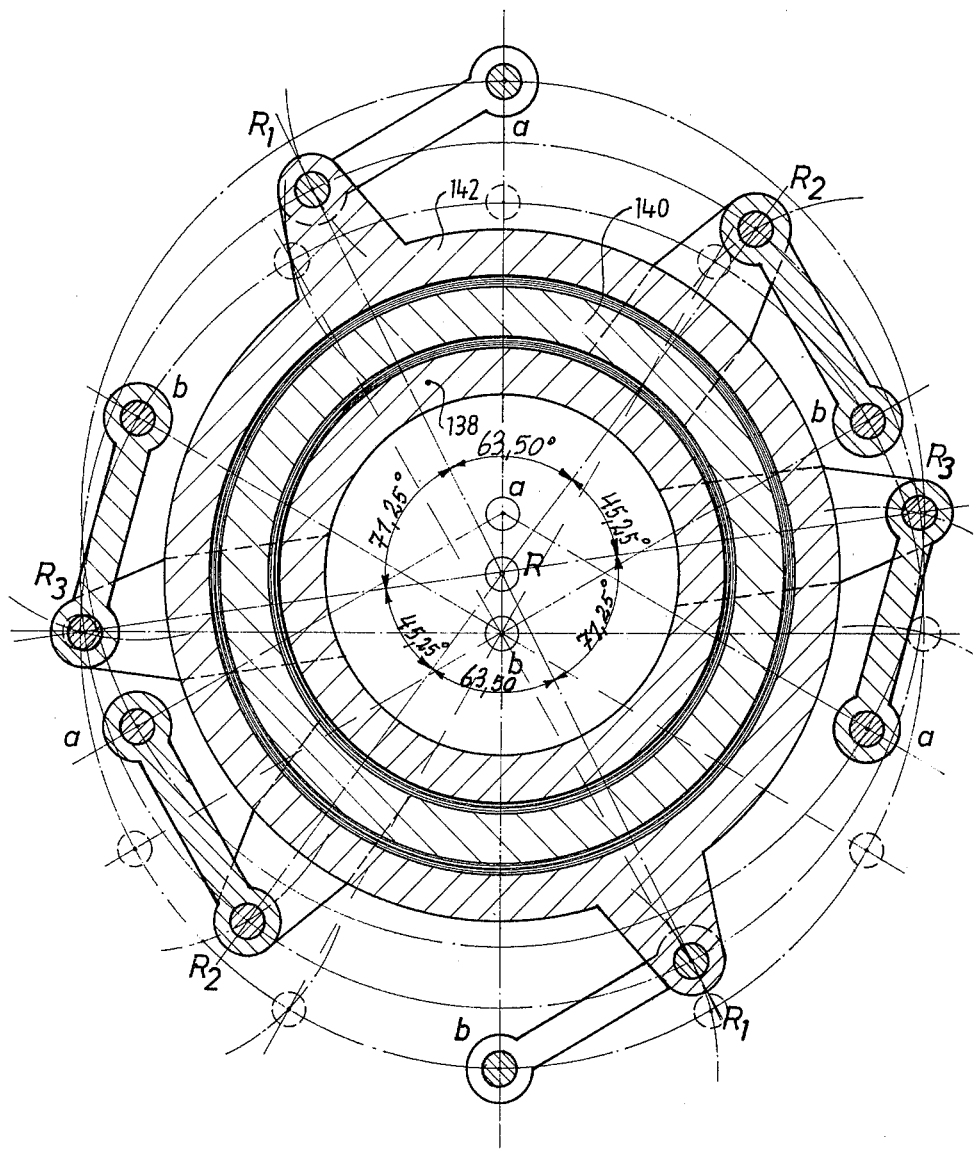
FIG. 9 shows the embodiment of FIG. 8 with the axes radially offset.

FIG. 9 shows the coupling with a radial offset of the shaft axes $a$ and $b$. All three rings 138, 140 and 142 are rotated relative to each other, and the center R of the rings is displaced laterally from the shaft axes.

FIG. 10 shows a detail namely the outer ring 142 with the extensions 164, 166 and the associated links 172, 178. FIG. 11 shows the ring 142 with a radial offset of the axes.

Figure 13:
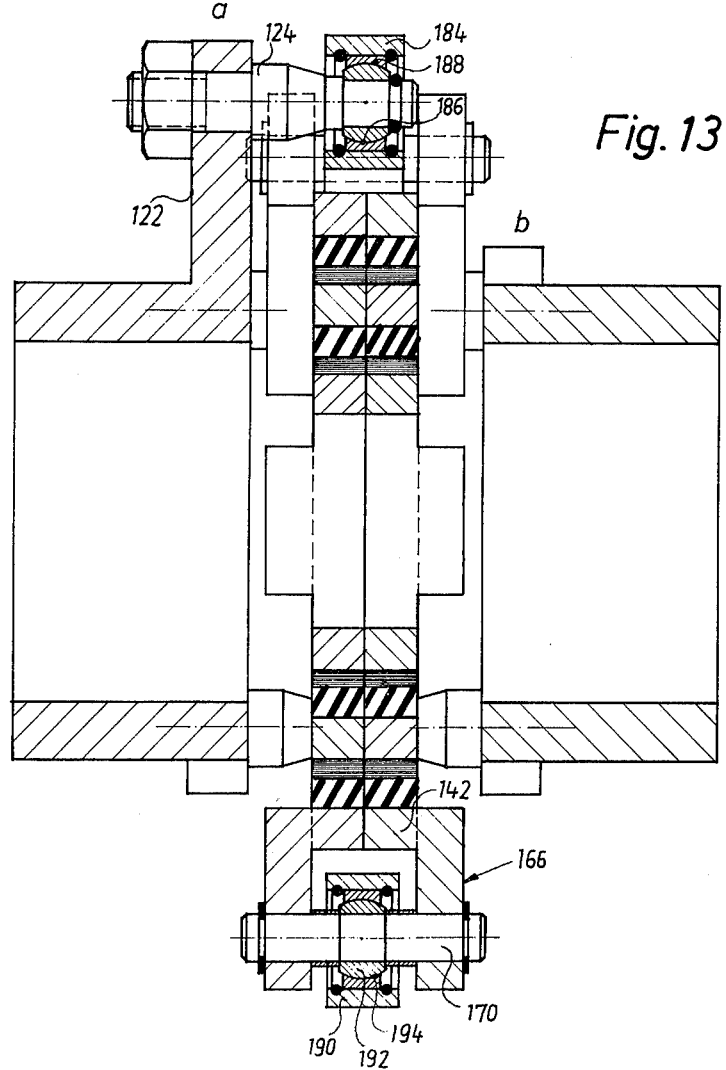
FIG. 13 is a sectional view along line E-F of FIG. 12.

The coupling of FIGS. 12 and 13 is similar to the coupling of FIGS. 8 and 9, and corresponding elements bear the same reference numerals as in the latter Figures. The coupling of FIGS. 11 and 12, however, differs from that of FIGS. 8 and 9 in two features: first, the outer and the median rings 140, 142 have elastomeric layers 186 and 184, respectively, with which the anti-friction layers 144 and 146, respectively are backed, in order to make the coupling resilient with respect to transmitted torques; second, the links are universally articulated both on the main coupling members and on the rings 138, 140, 142, whereby the coupling is also adapted to compensate for an inclination of one shaft axis relative to the other one.

As can be seen best from FIG. 13, pivot pins, such as 124, are provided on the driving coupling member 122. The link 172 has a boss 184 which surrounds the pivot pin 124. A ring 186 having a convex-spherical outer surface is mounted on the pivot pin. A ring 188 having a concave-spherical inner surface complementary to said convex-spherical surface is mounted in the boss and encloses the ring 186. In this way a ball and socket joint is formed which permits limited universal angular movement of the link 172 relative to the pivot pin 124.

At its other end the link, for example 178, has a boss 190. The radial extension 166 of ring 142, which is composed of two parts similar to FIG. 6, forms two arms between which the pivot pin 170 extends. A ring 192 having a convex-spherical outer surface is supported on the pivot pin 170. A ring 194 having a concave-spherical inner surface complementary to said convex-spherical surface is supported in lug 190 and encloses the ring 192. In this way a ball and socket joint is formed which permits limited universal angular movement of the link member 178 relative to the pivot pin 170.

Figure 14:
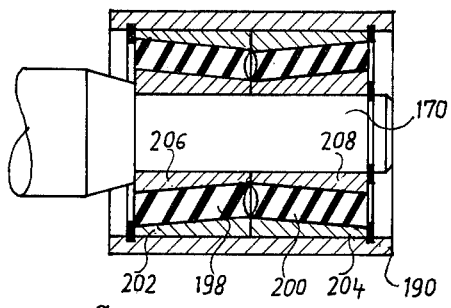
FIG. 14 illustrates a modification of the pivoting of the link members in the embodiment of FIGS. 12 and 13.

An alternative is shown in FIG. 14. The pivot pin 170 is encompassed by boss 190. Two rings 206, 208 tapering towards each other are mounted on pivot pin 170 to form two slightly conical annular faces inclined inwards. A bushing 202, 204 is mounted in the boss, said bushing tapering towards its ends to form two slightly conical annular faces inclined outwards. Precompressed conical rubber rings 210, 212 are held between the inwardly inclined annular faces and the outwardly inclined annular faces.

Figure 15:
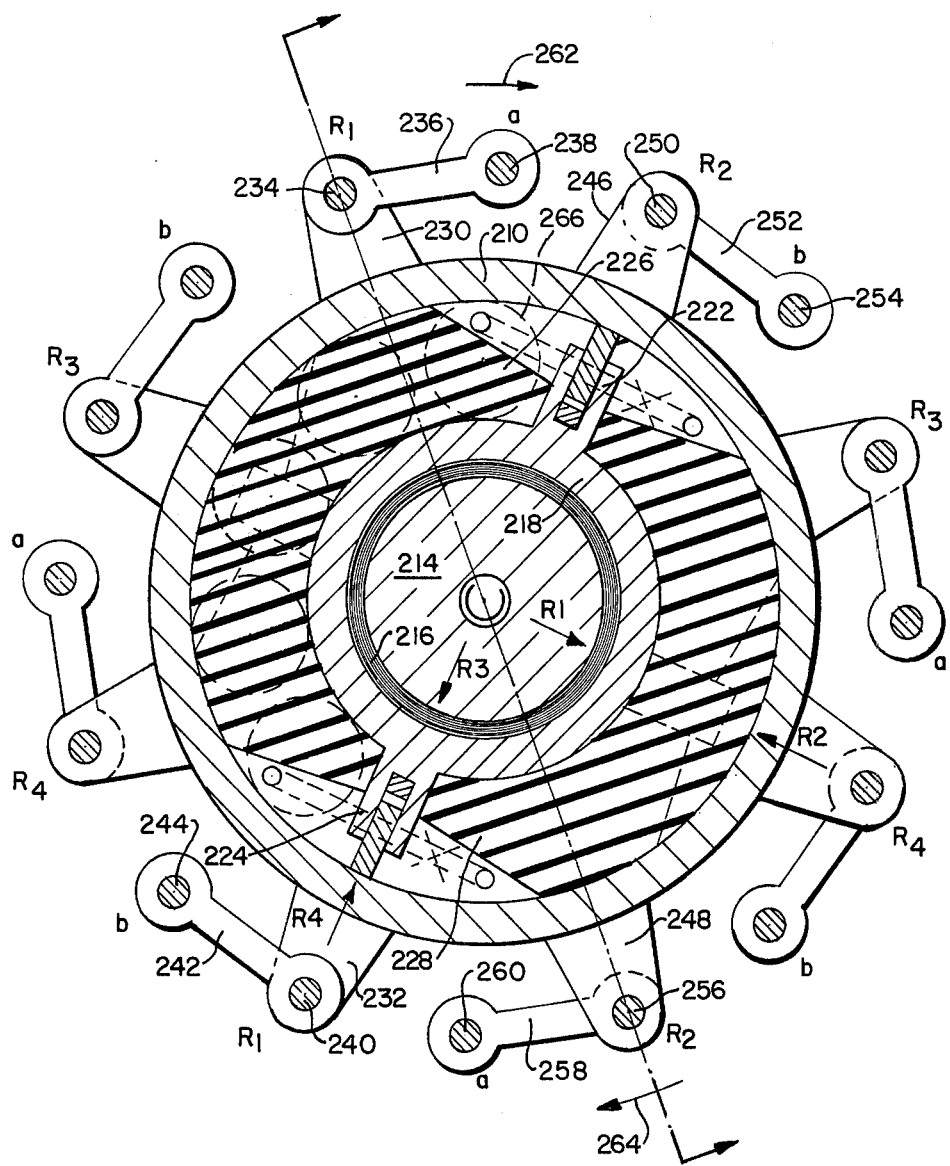
FIG. 15 illustrates a fourth embodiment of the invention, which is also resilient in peripheral direction.
Figure 16:
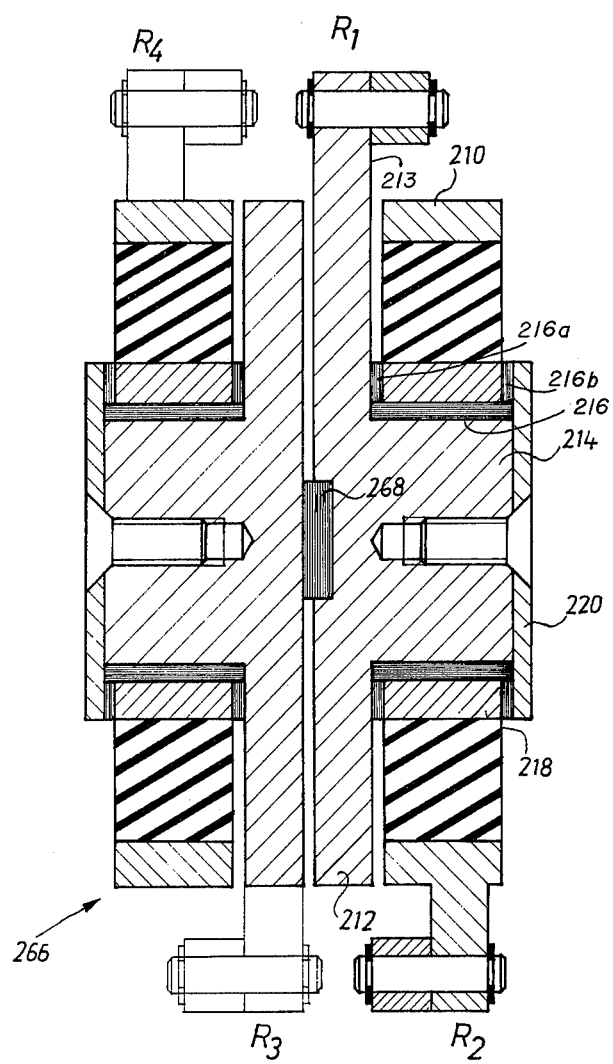
FIG. 16 is a sectional view along line G-H of FIG. 14.

FIGS. 15 and 16 show a further embodiment of a coupling resilient in peripheral direction and having more than two pairs of links. This coupling consists of two substantially identical couplings, which are "connected in parallel" in the torque transmission and of which one will be initially described.

The coupling comprises a ring 210 and a disc 212 having the same diameter. The disc 212 has an end face 213 and a cylindrical projection 214, forming a hub, extending from the end face and positioned within the ring 210. An inner ring 218 is journaled on the projection 214 by a journal bearing 216. As can be seen best in FIG. 16, the journal bearing consists of a cylindrical ring mounted on the peripheral surface of the cylindrical projection 214 and two radially extending rings 216a and 216b positioned between the end faces of the inner ring 218 and the disc 212 or a securing plate 220, respectively. The securing plate 220 is bolted to the end face of the projection 214 and extends across the end of the inner ring 218. Thus the end faces of the ring and disc are in sliding engagement with each other, the sliding being improved by the bearing 216a.

The inner ring 218 has two diametrically opposite radial extensions 222, 224. Two bodies 226, 228 of elastomeric material, such as rubber, are positioned between ring 210 and inner ring 218. These bodies have convex outer surfaces in conformity with the inner surface of ring 210 and have concave inner surfaces in conformity with the outer surface of the inner ring. As seen in FIG. 15, the side faces of the bodies 226, 228 extend slightly inclined outwards, so that spaces, the cross sections of which are substantially a circular segment, are left free between the bodies 226, 228 and the ring 210. These spaces permit deformation of the bodies 226, 228. The radial extensions 222, 224 of the inner ring 218 prevent the rotation of the bodies 226, 228.

Radial sealing strips are held by the bifurcated extensions 222 and 224. These are urged outwards and held in engagement with the inner wall of ring 210 by spring steel bars. Thereby the free spaces defined by the bodies 226 and 228, respectively, the ring 210 and the extensions 222 and 224, respectively, are separated from each other in liquid-tight manner by the sealing strips. The spaces, filled with a damping fluid, communicate through passages containing adjustable, fluid restrictors. Thereby the coupling can be given an adjustable damping characteristic.

Disc 212 has a pair of radial extensions 230, 232, extension 232 being angularly offset by 135° relative to extension 230. The extension 230 has a pivot pin 234 which is connected by a link 236 to a pivot pin 238 on a driving, main coupling member. A pivot pin 240 on the extension 232 is connected by a link 242 to a pivot pin 244 on a driven main coupling member. Ring 210 also has a pair of radial extensions 246, 248, extension 248 being angularly offset by 135° relative to extension 246. The extension 246 has a pivot pin 250, which is connected by a link 252 to a pivot pin 254 on the driven, main coupling member. A pivot pin 256 on the extension 248 is connected by a link 258 to a pivot pin 260 on the driving, main coupling member.

In the position shown in FIG. 15 the shaft axes are in alignment and the extensions 230 and 246 or 248 and 232, respectively, are angularly offset by 45°, so that the extension 230 of the disc 212 is diametrically opposite to the extension 248 of the ring 210, and the extension 232 of the disc 212 is diametrically opposite to the extension 246 of the ring 210. The plane of symmetry of each body 226 and 228 extends at a right angle to the plane containing the pivot pins 240 and 250.

In order to explain the effect of the elastomeric bodies, be it assumed that the driven, main coupling member with the pivot pins 244 and 254 is restrained by a resistance, while a clockwise torque acts on the driving, main coupling member tending to move the pivot pin 238 to the right in the sense of the arrow 262 and to move the pivot pin 260 to the left in the sense of the arrow 264. With the pin 244 stationary, the force 262 on the pin 238 tends to move the disc 212 substantially in the sense of the arrow indicated at R1. With pin 254 stationary, the force 264 on the pin 260 tends to move the ring 210 substantially in the sense of the arrow indicated at R2. It can be seen that the forces caused thereby act in opposition and compress the elastomeric body substantially in the direction of its plane of symmetry.

A second coupling of identical construction, which is designated generally by 266, is arranged with its disc back-to-back with the coupling just described and angularly offset by 90° relative thereto. Corresponding parts of the coupling 266 bear the same but primed (') reference numerals as the parts of the described coupling. In order to permit relative movement of the disc 212 and 212' a journal bearing 268 (FIG. 16) is provided therebetween.

Similar considerations as those in the last but one paragraph show that the coupling reacts to a resistance on the driven side with radially opposed forces in the senses of the arrows R3 and R4.

Instead of the bodies 226 and 228 a plurality of cylindrical rubber cushions 266 may be provided as indicated in dashed lines in FIG. 15.

Figure 17:
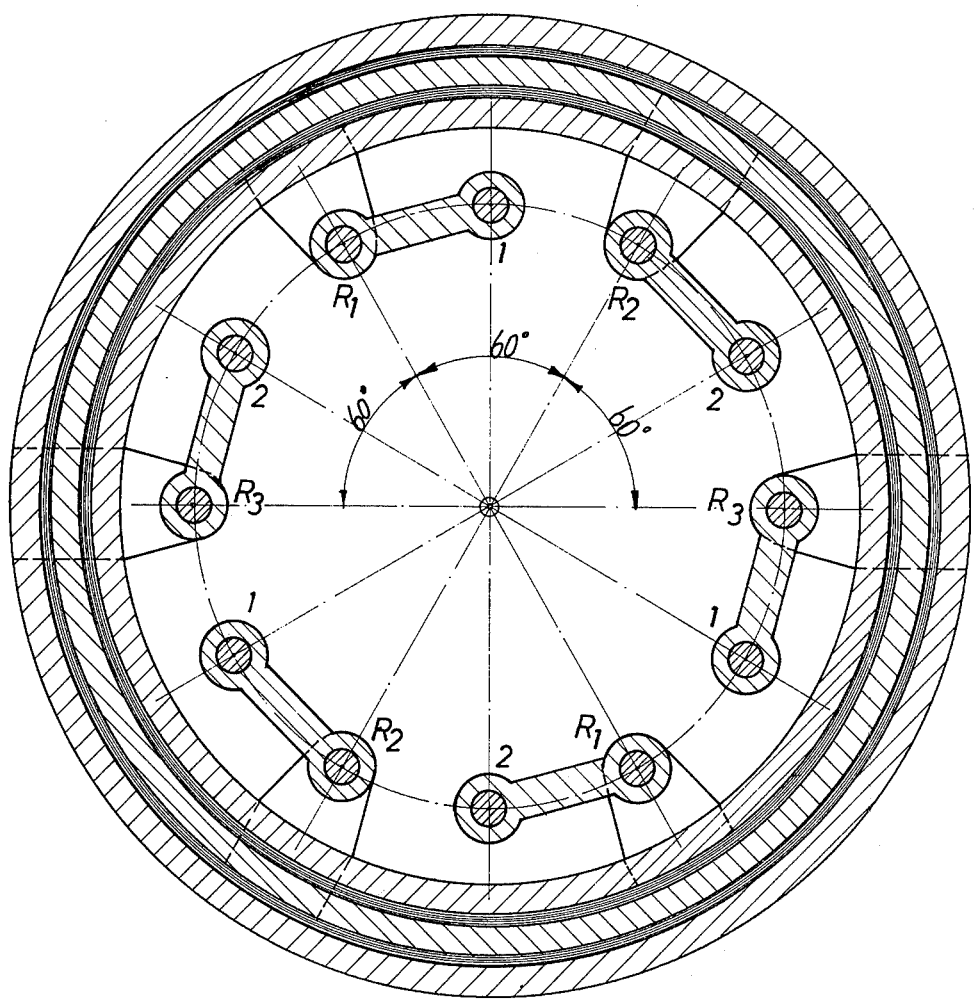
FIG. 17 illustrates a fifth embodiment of the invention in which the rings forming the intermediate members are located outside of the link members.
Figure 18:
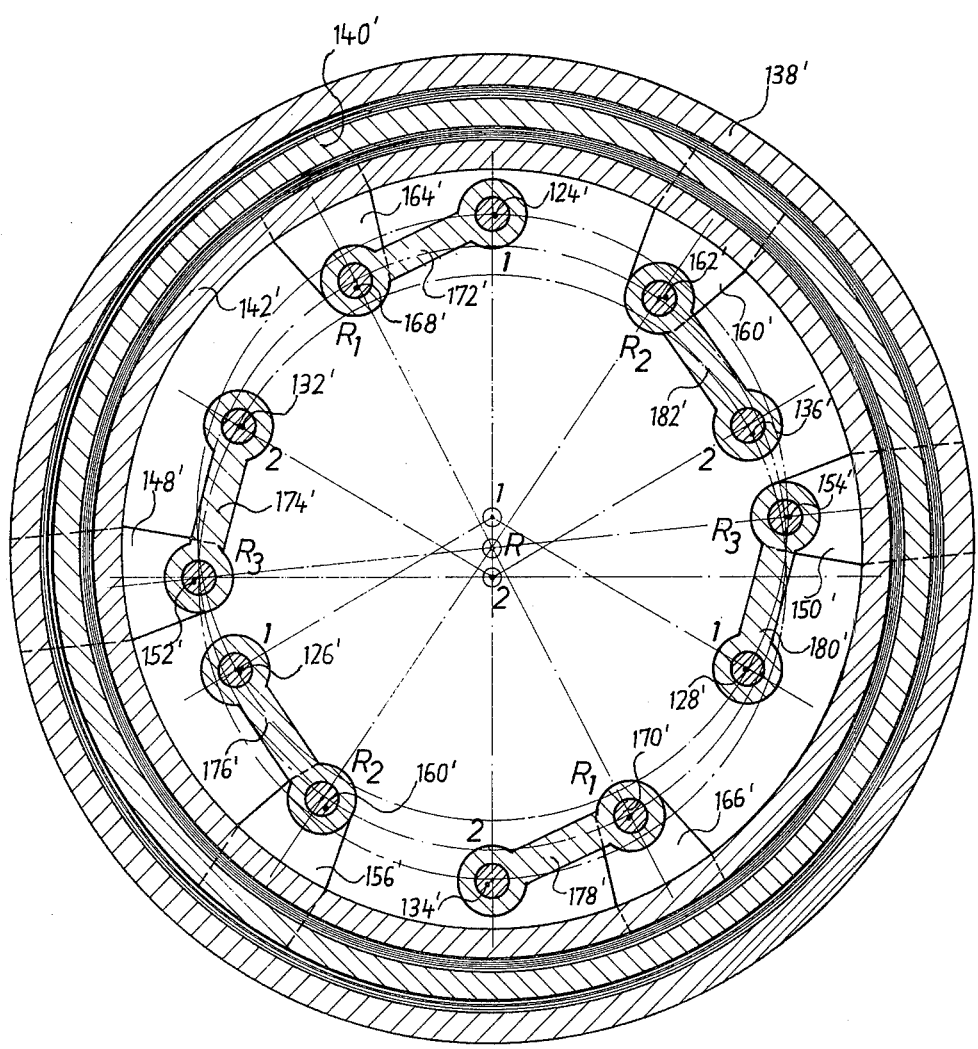
FIG. 18 illustrates the coupling of FIG. 17 with the axes radially offset.

FIGS. 17 and 18 illustrate a coupling having three rings, each one of which is connected to the driving coupling member through one link and to the driven coupling member through another link. This coupling operates generally like the coupling of FIGS. 8 and 9, and corresponding parts bear the same but primed (') reference numerals. Contrary to FIGS. 8 and 9, however, the radial extensions 148', 150', 160', 164' and 166' extend radially inward and the rings 138', 140', 142' (of which 138' is the outer one and 142' is the inner one) surround the links 172' to 182'.

Figure 19:
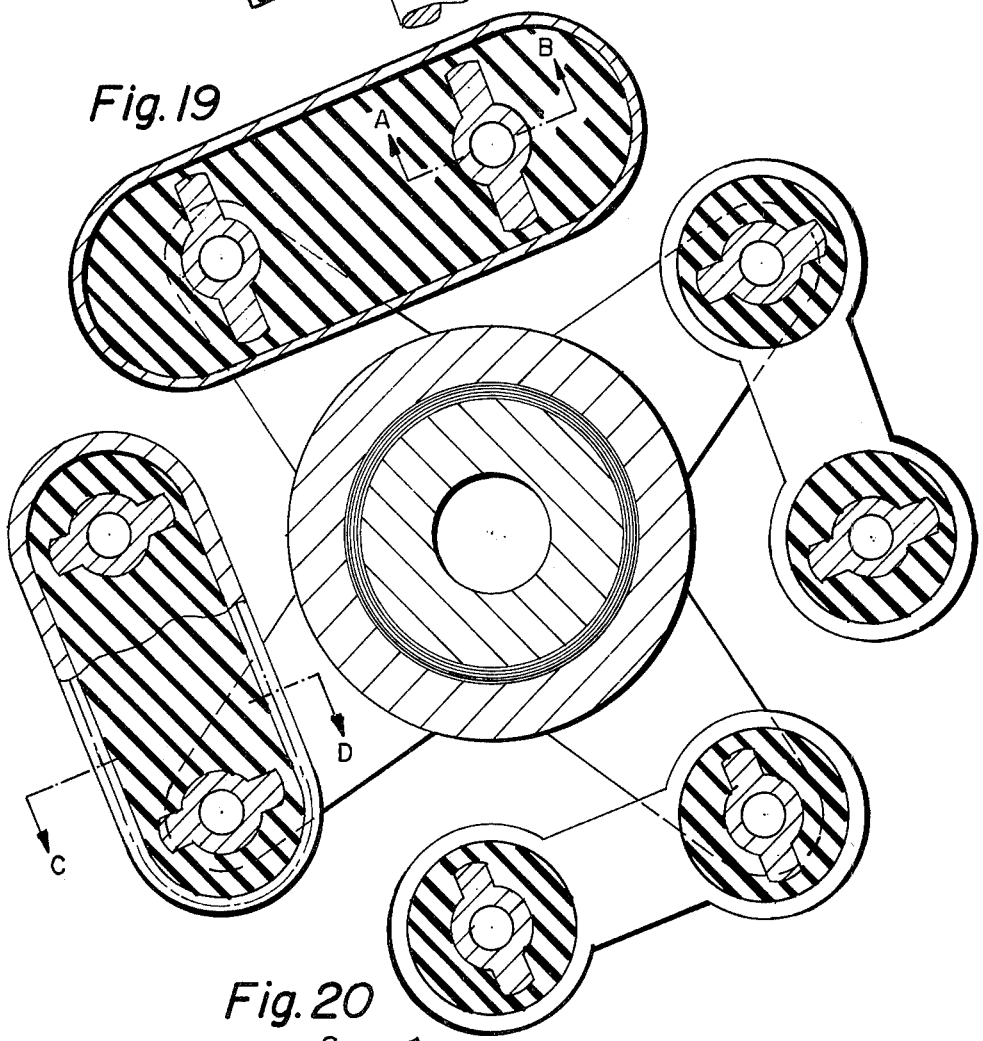
FIG. 19 illustrates a modification of the embodiment of FIG. 3.

FIG. 19 illustrates a different way of achieving resiliency of the coupling by resilient construction of the link members. The basic structure and operation of the coupling corresponds to that of the embodiment of FIG. 3 and, therefore, needs not to be described again.

In the right and lower portion of the Figure, the ends of the links have bosses with annular rubber bodies being mounted in said bosses. Journal rings having radial arms are held in the rubber bodies. These journal rings are journaled on the pivot pins. With such a construction, the whole area of the journal rings and arms acts to transmit pressure to the rubber bodies.

Figure 20:
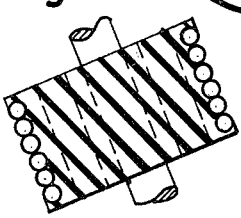
FIG. 20 is a sectional view along line C-D of FIG. 19.

The links in the left portion of FIG. 19 are of similar design. Each rubber body is, however, elongated as a single rubber body extending through the whole length of the link. It is possible to provide rigid oval lugs extending around both pivot pins and the rubber body, as shown in the upper half of the lower left link. Alternatively, the rubber body may be surrounded by ropes which permit lateral "breathing" of the rubber body with longitudinal load, as shown in the lower half of the lower left link member in FIG. 19 and in FIG. 20.

Figure 21:
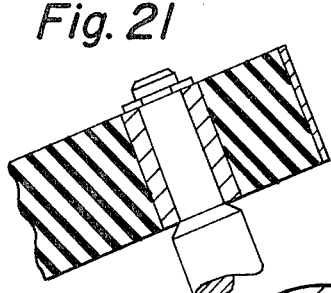
FIG. 21 is a sectional view along line A-B of FIG. 19.

As shown in the upper portion of FIG. 19 and in FIG. 21, the rubber body may extend beyond the pivot pins in longitudinal direction to such an extent, that substantially the same resiliency to tensional and compression load is achieved. Instead of a boss, a shell of sheet spring steel may be provided around the rubber body, which shell also permits lateral "breathing" of the rubber body upon compression.

Figure 22:
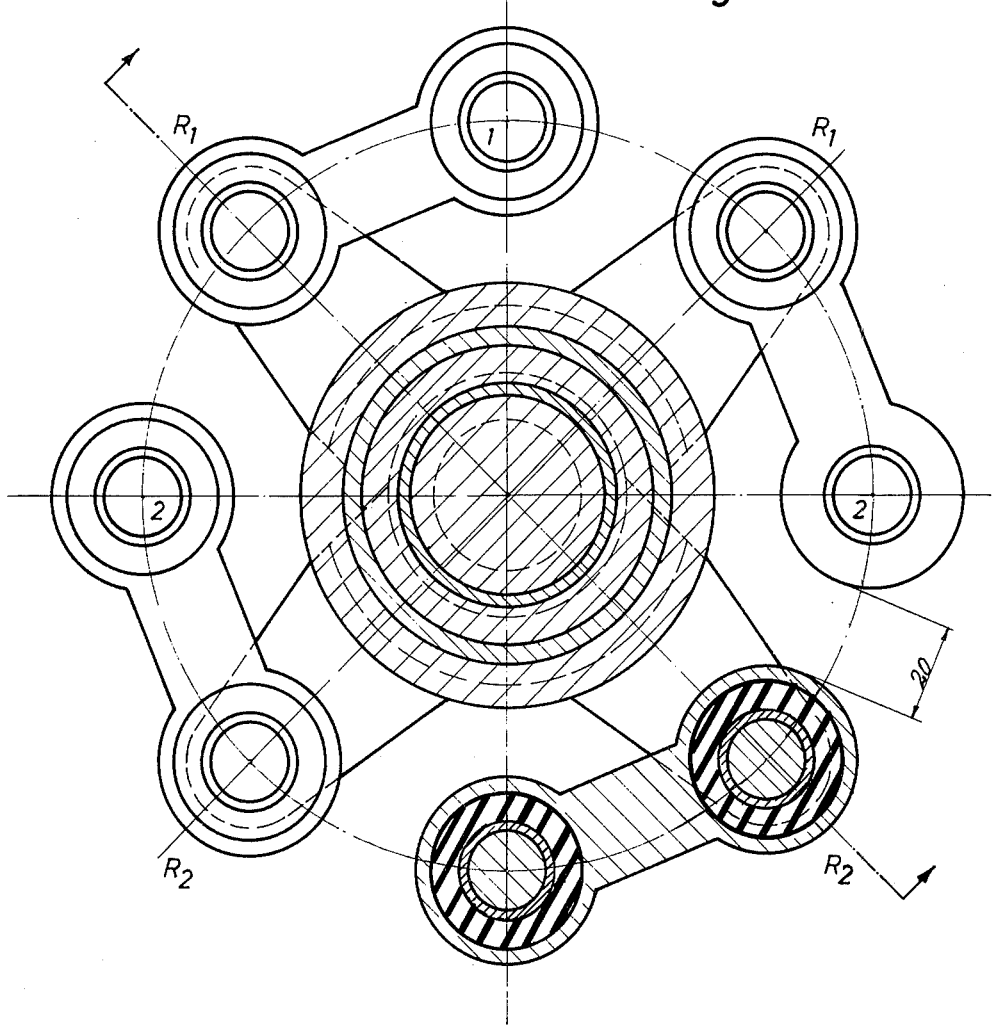
FIG. 22 illustrates a further modification of the embodiment of FIG. 3.
Figure 23:
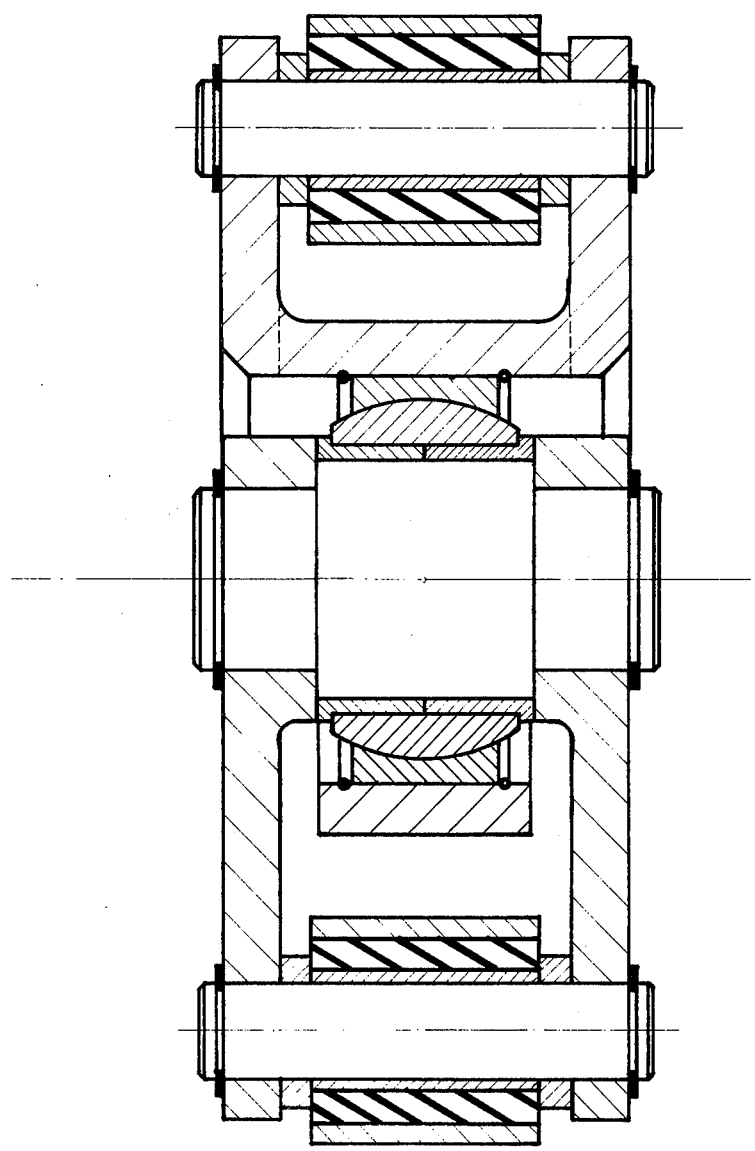
FIG. 23 is a sectional view along the section line in FIG. 22.

In the embodiment of FIGS. 22 and 23, which is also similar to that of FIG. 3, a ball and socket joint is provided between the rings forming the intermediate coupling members. The links are pivoted on the associated pivot pins through rubber cushions. This embodiment permits angular offset between the first and second shafts.

FIGS. 24 and 25 illustrate an embodiment wherein the coupling requires substantially no maintenance and permits not only relative radial movement of the shafts but also angular offset, i.e., the shaft axes not being parallel. The basic construction of the coupling of these Figures is simiar to that of FIG. 8, and elements in FIGS. 24 and 25 are designated by the reference numerals increased by 200 over the corresponding elements of FIG. 8. With respect to the general construction and operation reference is had to the description of the embodiment of FIG. 8.

In this embodiment the radial extensions, such as 366, consist of pairs of lateral side pieces, which are affixed to the rings, such as 342, and extend laterally around the rings, for example 340, 342. The rings are spaced axially from the main coupling members and the radial extensions thereof as shown in FIG. 25 with respect to the extension 322. The pivot pins, such as 370, extend between the lateral side pieces.

The links consist of straight spring steel wire pieces, such as 378, which have their ends curled to form rings 367, 369. The rings 367 and 369 are pivoted on pivot pins 370 and 334 and are held between spacers 361 and 371 (FIG. 25). The pivot pins 370 consist of threaded bolts which extend through the lateral side pieces 366. The spacers 361, 371 are tightened on the rings by means of a nut 365 with an interposed spring washer 363.

The pivot pins on the main coupling members are constructed in the manner of pivot pin 324. The pivot pin 324 comprises a cylindrical central portion of relatively large diameter, which has relatively smaller diameter threaded pins projecting from the two ends. One of the smaller pins extends through a bore in radial extension 322 of the main coupling member and carries a spring washer 379 and a nut 381, by which the pivot pin 324 is tightened on the coupling member 322. A ring 374 of link 372, a spacer 375 and a nut 377 are mounted on the other projecting pin.

In order to increase the resiliency of the coupling to angular offset of the shaft axes, the links may also be of the type of links 376 and 382 in FIG. 24. These links also consist of spring steel wire pieces. They include, however, one turn of a helix 375 and 383, respectively, between the lugs. This turn may be oval, if required. This turn is provided to accommodate an increased length of spring steel wire with predetermined length and longitudinal rigidity of the link, said increased length resulting in increased resiliency and reduced restoring forces.

With angular offset of the shaft axes, the spring resiliency of the links permits a relative tilting movement of the main coupling members, with also a relative rotary movement of the rings. If, for example, the second shaft is tilted with respect to the first one clockwise in FIG. 25, then, as viewed in FIG. 24, the pin 324 is moved to the front and the pin 234 is moved to the rear. As the length of the links 372 and 378 is not variable, the outer ring 342 will be rotated clockwise through an angle, since link 372 draws extension 364 and link 378 draws extension 366 in the same sense. Because of the centrosymmetrical arrangement of the associated extensions and pivot pins, such a compensating movement becomes possible. The transmission of the rotary movement remains angle-true.

I claim:

1. In a rotary coupling comprising a first main coupling member defining a first axis, a second main coupling member defining a second axis, intermediate coupling member means, and connecting means interconnecting the intermediate coupling member means and said main coupling members to permit said second axis to be radially offset with respect to said first axis, the improvement comprising:

said intermediate coupling member means comprising two intermediate coupling members rotatable relative to each other about a third axis;

said connecting means comprising links connecting each of intermediate coupling members with each of said main coupling members.

2. In a coupling as set forth in claim 1 wherein said links include:

a first pair of links pivotally connected to the first main coupling member at two pivot points located centrosymmetrically with respect to the first axis, said links of said first pair extending substantially tangentially in the same direction and with one being pivotally connected to the one intermediate coupling member and the other being pivotally connected to the other intermediate coupling member;

a second pair of links pivotally connected to the second main coupling member at two pivot points located centrosymmetrical with respect to the second axis, said links of said second pair extending substantially tangentially in opposite direction to the links of said first pair, one link of said second pair being pivotally connected to said one intermediate coupling member and the other link of said second pair being pivotally connected to said other intermediate coupling member.

3. In a coupling as set forth in claim 2, wherein the pivotal connections on each of the intermediate coupling members are angularly offset by 180° relative to each other about the third axis.

4. In a coupling as set forth in claim 1, wherein each of said intermediate coupling members are rings, said connecting means including a pivotal connection between each link and the respective member to which the link is connected.

5. In a coupling as set forth in claim 4, wherein the pivotal connections of the first main coupling member and the links connected thereto are located in regular array on a circle of a given diameter about the first axis, the pivotal connections of the second main coupling member and the links connected thereto are located in regular array on a circle of said given diameter about the second axis and are positioned angularly between the pivotal connections on the first main coupling member, the intermediate coupling members have two radial extensions, said pivotal connections of the links and the intermediate coupling members being on said radial extensions and being located on a circle of said given diameter about the third axis.

6. In a coupling as set forth in claim 5, wherein said links include:
a first pair of links pivotally connected to the first main coupling member at two pivot points located centrosymmetrically with respect to the first axis, said links of said first pair extending substantially tangentially in the same direction and with one being pivotally connected to the one intermediate coupling member and the other being pivotally connected to the other intermediate coupling member; and
a second pair of links pivotally connected to the second main coupling member at two pivot points located centrosymmetrical with respect to the second axis, said links of said second pair extending substantially tangentially in opposite direction to the links of said first pair, one link of said second pair being pivotally connected to said one intermediate coupling member and the other link of said second pair being pivotally connected to said other intermediate coupling member, the pivotal connections on the second main coupling member being angularly offset by substantially 90° with respect to the pivotal connections on the first main coupling member, the extensions of each ring being angularly offset by 90° about the third axis.

7. In a coupling as set forth in claim 5, wherein the connecting means comprises a first set of three links pivotally connected to the first main coupling member at three pivot points angularly offset by 120° about the first axis, a second set of three links pivotally connected to the second main coupling member at pivot points angularly offset relative to each other by 120° about the second axis and angularly offset by substantially 60° with respect to the pivot points of the first set, and
the intermediate coupling member means comprise an inner ring, a median ring mounted thereon and an outer ring mounted on the median ring, the radial extensions of each ring being angularly offset by 180° about the third axis,
each link of the first set being pivotally connected to one extension of each ring respectively, and each link of the second set being pivotally connected to the other extension of each ring respectively.

8. In a coupling as set forth in claim 5, wherein each extension on one ring is one of a pair of extensions, the extensions of each pair being spaced from each other and positioned at opposite sides of the second ring, said connecting means including a pivot pin mounted on each pair of extensions and extending therebetween, and the respective link being positioned between the pair of extensions and pivoted on the respective pivot pin.

9. In a coupling as set forth in claim 5, wherein one of the extensions of one ring is symmetrical to the center plane of that ring, said connecting means including a pivot pin mounted in said one extension and projecting axially out of the extension on both sides thereof, and the link connected to that one extension having a pair of bifurcated bearing bosses positioned at opposite sides of said one extension and pivoted on the projecting ends of the pivot pins.

10. In a coupling as set forth in claim 5, wherein the extensions project radially outwards from the rings, the links being located outside the rings.

11. In a coupling as set forth in claim 5, wherein the extensions project radially inwards from the rings, the links being located inside the rings.

12. In a coupling as set forth in claim 4, wherein the rings include an inner ring and a coplanar outer ring, a sliding bearing comprising a layer of oil-soaked brake liner material positioned between said rings and supporting the outer ring on the inner ring.

13. In a coupling as set forth in claim 4, wherein the rings include an inner ring and a coplanar outer ring, an antifriction bearing positioned between said rings and supporting the outer ring on the inner one.

14. In a coupling as set forth in claim 4, wherein one of the rings includes a radially resilient, elastomeric layer.

15. In a coupling as set forth in claim 1, wherein the connecting means includes universal joints connecting the links to the members.

16. In a coupling as set forth in claim 15, wherein the universal joints are ball and socket joints.

17. In a coupling as set forth in claim 15, wherein the universal joints are resilient joints.

18. In a coupling as set forth in claim 15, wherein each intermediate coupling member has a plurality of pairs of radial extensions, the extensions of each pair being spaced from each other, said connecting means including a pivot pin extending between the extensions of each pair, one of said universal joints being mounted on each pin and positioned between the respective pair of extensions.

19. In a coupling as set forth in claim 15, wherein each link has two ends and includes a boss on each of said ends, each boss having an opening therethrough, said connecting means including a plurality of pins, each pin extending through the opening in a respective boss and being smaller than said opening, each pin being attached to a respective member and positioned parallel to the axis thereof, one of said universal joints being between each pin and the respective boss and comprising
a bushing mounted on the pivot pin, said bushing tapering towards its ends so as to form two slightly conical annular faces inclined towards the ends, two rings tapering towards each other supported in the boss so as to form two slightly conical annular faces inclined towards the inside, and respective precompressed conical rubber rings between each of the annular faces inclined towards the ends and inclined towards the inside.

20. In a coupling as set forth in claim 1, wherein one of said intermediate coupling members is a first ring and the other intermediate coupling member is a disc of substantially the same diameter as that of the ring, the disc having a central axial cylindrical projection extending into the first ring, a second ring within the first ring and rotatably mounted on said projection, said second ring being spaced from the first ring and having radial arms extending toward the first ring, and precompressed elastomeric bodies positioned on both sides of said arms between the first and second rings.

21. In a coupling as set forth in claim 20, including means providing a seal between the radial arms and the first ring, said elastomeric bodies leaving spaces between the two rings, means including a restrictor forming a fluid communication between the spaces on opposite sides of the arms, said spaces being filled with a damping fluid.

22. In a coupling as set forth in claim 21, wherein the restrictor is adjustable.

23. In a coupling as set forth in claim 1, wherein said connecting means includes connecting devices between the links and the members, each connecting device comprising a pivot bushing and a rubber cushion.

24. In a coupling as set forth in claim 23, wherein the rubber cushion extends the full length of the link and forms a part of the link, said cushion having one of said pivot bushings adjacent each end of the link, said link including an oval shell portion extending around said rubber cushion.

25. In a coupling as set forth in claim 24, wherein the shell portion comprises a group of ropes.

26. In a coupling as set forth in claim 24, wherein the shell portion is of sheet spring steel.

27. In a coupling as set forth in claim 24, wherein the rubber cushion extends longitudinally beyond the pivot bushings to an extent to achieve substantially the same resiliency to compression and tensile load.

28. In a coupling as set forth in claim 1, including ball and socket joint means interconnecting the intermediate coupling members, said connecting means including universal connections between the links and the respective members.

29. In a coupling as set forth in claim 1, wherein each link comprises a spring steel wire piece.

30. In a coupling as set forth in claim 29, wherein the spring steel wire piece has one winding of a helix between the ends thereof.

31. In a coupling as set forth in claim 29, wherein, as to each intermediate member the pivotal connections on that member are diametrically opposite, and as to the main members the pivotal connections of one main member are diametrically opposite the pivotal connections of the other main member when the first and second axes are aligned.

32. In a coupling as set forth in claim 29, wherein the ends of the spring steel wire piece are bent to form rings.

33. In a coupling as set forth in claim 1, wherein said intermediate coupling member means includes a third intermediate coupling member rotatable about said third axis with respect to the other two intermediate coupling members; and said connecting means includes links connecting said third intermediate coupling member with each of said main coupling members.

34. In a coupling as set forth in claim 33, wherein said connecting means comprising a first set of three links pivotally connected to the first main coupling member at three points angularly offset about the first axis, each link of said first set being pivotally connected to a respective one of said intermediate coupling members, and a second set of three links pivotally connected to the second main coupling member at three points angularly offset about the second axis, each link of said second set being pivotally connected to a respective one of said intermediate coupling members.

35. In a coupling as set forth in claim 34, wherein the pivot points of the links of said first set on said first main coupling member are all arranged at a given distance from said first axis and angularly offset relative to each other by 120° about said first axis, the pivot points of the links of said second set on said second main coupling member are all arranged at said given distance from said second axis, said links of said first and second sets having equal lengths and extending in the same direction from the respective pivot points on the first and second main coupling members, the pivot points of the links of said first and second sets on the respective intermediate coupling member being all arranged at said given distance from said third axis, and the pivot points on each intermediate coupling member to which one link of the first set and one link of the second set is pivoted to that intermediate coupling member being diametrically opposite.

36. In a coupling as set forth in claim 35, wherein, with said first, second and third axes in alignment, the pivot points of said first set of links on said first main coupling member and the adjacent pivot points of said second set of links on said second coupling members are angularly offset by 60° about the common axis, and the adjacent pivot points of said first and second sets of links on different intermediate coupling members are angularly offset by 60° relative to each other and angularly offset by 30° relative to the intervening pivot points on said first and second main coupling members.

37. In a rotary coupling comprising a first main coupling member defining a first axis, a second main coupling member defining a second axis, and a device rotationally interconnecting said coupling members to permit said second axis to be radially offset with respect to said first axis, the improvement wherein said device comprises:
first means comprising a first intermediate coupling member defining a third axis, said first means having an end face normal to said axis and a hub projecting axially from said end face and concentric about said third axis;
second means comprising a second intermediate coupling member, said second means being rotatably mounted on said hub for rotation about said third axis with respect to the first means, said second means including an end face in sliding engagement with said end face of said first means; and
link means connecting each of said first and second means respectively with each of said main coupling members.

38. In a coupling as set forth in claim 37, wherein said first intermediate coupling member is in the form of a disc, and said second means includes a bearing in contact with said end face of said first means.

* * * * *